United States Patent
Quinlan et al.

(10) Patent No.: US 9,485,276 B2
(45) Date of Patent: Nov. 1, 2016

(54) DYNAMIC SERVICE HANDLING USING A HONEYPOT

(71) Applicant: Juniper Networks, Inc., Sunnyvale, CA (US)

(72) Inventors: Daniel J. Quinlan, Sunnyvale, CA (US); Oskar Ibatullin, Sunnyvale, CA (US); Bryan Burns, Portland, OR (US); Oliver Tavakoli, Monte Sereno, CA (US); Robert W. Cameron, Mountain View, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 14/586,401

(22) Filed: Dec. 30, 2014

(65) Prior Publication Data
US 2015/0121529 A1    Apr. 30, 2015

Related U.S. Application Data

(63) Continuation-in-part of application No. 13/631,398, filed on Sep. 28, 2012, now abandoned.

(51) Int. Cl.
G06F 17/00 (2006.01)
H04L 29/06 (2006.01)

(52) U.S. Cl.
CPC .................. *H04L 63/1491* (2013.01)

(58) Field of Classification Search
CPC .............. H04L 63/1491; H04L 63/0272
See application file for complete search history.

(56) References Cited

U.S. PATENT DOCUMENTS

| | | |
|---|---|---|
| 6,363,489 B1 | 3/2002 | Comay et al. |
| 6,435,283 B1 | 8/2002 | Ohtomo et al. |
| 6,981,155 B1 | 12/2005 | Lyle et al. |
| 7,748,040 B2 | 6/2010 | Adelstein et al. |
| 7,773,540 B1 | 8/2010 | Zatko |
| 8,286,249 B2 | 10/2012 | Adelstein et al. |
| 2002/0046351 A1* | 4/2002 | Takemori ............... G06F 21/55 726/23 |
| 2002/0078382 A1 | 6/2002 | Sheikh et al. |
| 2002/0129264 A1 | 9/2002 | Rowland et al. |
| 2002/0162017 A1 | 10/2002 | Sorkin et al. |
| 2002/0163934 A1 | 11/2002 | Moore et al. |
| 2004/0003285 A1* | 1/2004 | Whelan ............... H04L 63/1408 726/23 |
| 2004/0010718 A1 | 1/2004 | Porras et al. |

(Continued)

FOREIGN PATENT DOCUMENTS

| | | |
|---|---|---|
| EP | 1244264 A2 | 9/2002 |
| WO | 02071192 A2 | 9/2002 |

OTHER PUBLICATIONS

Oudot, "Fighting Internet Worms with Honeypots," Security Focus, Oct. 23, 2003, 9 pp.

(Continued)

*Primary Examiner* — Mohammed Waliullah
(74) *Attorney, Agent, or Firm* — Shumaker & Sieffert, P.A.

(57) ABSTRACT

A network device comprises one or more processors coupled to a memory, and a dynamic services module configured for execution by the one or more processors to receive, from a client device, a service request specifying a service. The dynamic service module is further configured for execution by the one or more processors to, in response to obtaining a negative indication for the service, send a representation of the service request to a honeypot to cause the honeypot to offer the service to the client device.

31 Claims, 10 Drawing Sheets

(56) References Cited

U.S. PATENT DOCUMENTS

| | | |
|---|---|---|
| 2004/0078592 A1 | 4/2004 | Fagone et al. |
| 2004/0128543 A1 | 7/2004 | Blake et al. |
| 2005/0050353 A1 | 3/2005 | Thiele et al. |
| 2006/0053490 A1 | 3/2006 | Herz et al. |
| 2007/0165648 A1* | 7/2007 | Joo .................. H04L 29/12028 370/395.54 |
| 2007/0199070 A1 | 8/2007 | Hughes |
| 2008/0141374 A1 | 6/2008 | Sidiroglou et al. |
| 2008/0250159 A1 | 10/2008 | Wang et al. |
| 2008/0256632 A1* | 10/2008 | Stockdell ............ H04L 63/1458 726/22 |
| 2009/0328216 A1 | 12/2009 | Rafalovich et al. |
| 2011/0063992 A1* | 3/2011 | Weng .................. H04L 12/4679 370/252 |
| 2012/0311691 A1 | 12/2012 | Karlin et al. |
| 2013/0125112 A1 | 5/2013 | Mittal et al. |
| 2013/0242743 A1* | 9/2013 | Thomas .............. H04L 63/0227 370/236 |
| 2014/0096229 A1 | 4/2014 | Burns et al. |
| 2014/0105007 A1* | 4/2014 | Pathmasuntharam H04L 12/2856 370/230 |

OTHER PUBLICATIONS

Jiang et al., "Collapsar: A VM-Based Honeyfarm and Reverse Honeyfarm Architecture for Network Attack Capture and Detention," J. Parallel Distrib. Comput., vol. 66, Sep. 2006, 16 pp.

Jiang et al., "vEye: behavioral footprinting for self-propagating worm detection and profiling," Knowl Inf Syst, vol. 18, Jan. 2009, 32 pp.

Watson, "Honeynets: a tool for counterintelligence in online security," Network Security, Jan. 2007, 5 pp.

Examination Report from Counterpart European Patent Application No. 13186288.0, dated Nov. 19, 2014, 5 pp.

Extended Search Report from Counterpart European Patent Application No. 13186288.0, dated Jan. 7, 2014, 11 pgs.

Response to Extended Search Report dated Apr. 7, 2014, from Counterpart European Patent Application No. 13186288.0, dated Sep. 30, 2014, 17 pp.

Prosecution History from U.S. Appl. No. 13/631,398, dated Jan. 30, 2014 through Nov. 14, 2014, 55 pp.

Extended Search Report from counterpart European Application No. 15202266.1, dated May 17, 2016, 7 pp.

* cited by examiner

DYNAMIC SERVICE HANDLING USING A HONEYPOT

CROSS REFERENCE TO RELATED APPLICATIONS

This application is a continuation-in-part of application Ser. No. 13/631,398, filed Sep. 28, 2012, which is incorporated herein by reference in its entirety.

TECHNICAL FIELD

The invention relates generally to computer network security, and more specifically to computer network honeypots.

BACKGROUND

Computers are valuable tools in large part for their ability to communicate with other computer systems and exchange information over computer networks. Networks typically comprise an interconnected group of computers, linked by wire, fiber optic, radio, or other data transmission means, to provide the computers with the ability to transfer information from computer to computer. The Internet is perhaps the best-known computer network, and enables millions of people to access millions of other computers such as by viewing web pages, sending e-mail, and by performing other computer-to-computer communication.

Because the size of the Internet is so large and Internet users are so diverse in their interests, it is not uncommon for malicious users or pranksters to attempt to communicate with other users' computers in a manner that poses a danger to the other users. For example, a hacker may attempt to log in to a corporate computer to steal, delete, or change information. Computer viruses, worms, and/or Trojan horse programs may be distributed to other computers, or unknowingly downloaded or executed by computer users. Further, computer users within an enterprise may on occasion attempt to perform unauthorized network communications, such as running file sharing programs or transmitting secrets from within the enterprise network to the Internet.

For these reasons, network administrators may deploy within networks a decoy computer system, or "honeypot," that is designed to attract the attention of intruders and to gather and report information regarding intrusions. That is, the honeypot may be a server deployed within the enterprise network that simulates network services, such as database, application, and/or other services, with the express purpose of attracting malicious traffic to collect information respecting attack patterns and the source(s) of intrusions in order to identify infected network devices and suspected attackers.

SUMMARY

In general, techniques are described in which a network device, such as a security appliance (e.g., a firewall), leverages a honeypot service to dynamically imitate non-existent services in response to service requests made to servers within a protected network. For example, a network administrator may deploy a network device to protect a network of servers offering a variety of application-layer services to clients located both inside and outside of the network. These servers may, for example, have respective layer 3 (L3) or other addresses or be load-balanced to provide services sourced by a single address. However, in most cases the services provided by each server in the network are not comprehensive, that is, for a given server there are one or more services that the server does not provide. The server may respond to a service request that specifies such a non-existent service by either not responding to the request or by sending a response explicitly refusing the connection. By contrast, the server may respond to a service request specifying a provided service with a positive acknowledgement indicating the client device that issued the service request may proceed with the service. A service may also not exist for the reason that the address from which the service is requested is not a host address for a computing device within the network.

As described in further detail below, the network device may monitor service request and response traffic traversing the protected network boundary to identify service requests specifying non-existent services. In some instances, the network device stores records of service requests entering the protected network boundary via the network device. For a given service request for which the network device does not receive an indication from a server that the server provides the specified service, i.e., the service does not exist, the network device leverages a honeypot to dynamically imitate the specified service to the requesting client device. For example, the network device may send to the client device a positive indication that the non-existent service exists within the protected network despite the network device receiving a response from a server explicitly refusing the connection or failing to receive any response after an elapsed time. The network device may further, or alternatively, forward a copy of the service request to a honeypot that processes the service request to log, analyze, and in some cases respond with a responsive service traffic, which the network device may relay to the client device. In this way, the network device leverages the honeypot to dynamically offer or "stand up" the requested service on-the-fly to make it appear to the client device as if the service exists as a service provided by a server within the protected network, regardless of whether the server from which the service is requested exists or actually provides the service. Accordingly, the techniques being service-based and dynamic, may automatically account for services being added, removed, and reconfigured in the network that includes or is protected by the network device.

The client device may, upon receiving the positive indication for the requested service, continue to interact with the honeypot via the network device in accordance with the parameters of the service request. In doing so, the client device is deflected at least in some measure from further attacks on the protected network, and the client device may reveal any nefarious tactics to the honeypot in its interactions with the requested but non-existent service, which may allow the administrator or researchers to improve overall security of the protected network.

In one example, a method comprises receiving, by a network device from a client device, a service request specifying a service; and by the network device and in response to obtaining a negative indication for the service, sending a representation of the service request to a honeypot to cause the honeypot to offer the service to the client device.

In another example, a network device comprises one or more processors coupled to a memory, and a dynamic services module configured for execution by the one or more processors to receive, from a client device, a service request specifying a service. The dynamic service module is further configured for execution by the one or more processors to, in response to obtaining a negative indication for the service, send a representation of the service request to a honeypot to cause the honeypot to offer the service to the client device.

In another example, a non-transitory computer-readable storage medium comprises instructions stored thereon that, when executed, configure one or more processors to receive, by a network device from a client device, a service request specifying a service; and by the network device and in response to obtaining a negative indication for the service, send a representation of the service request to a honeypot to cause the honeypot to offer the service to the client device.

The details of one or more examples of the invention are set forth in the accompanying drawings and the description below. Other features, objects, and advantages will be apparent from the description and drawings, and from the claims.

BRIEF DESCRIPTION OF THE FIGURES

Like reference characters denote like elements throughout the figures and text.

DETAILED DESCRIPTION

Figure 1:
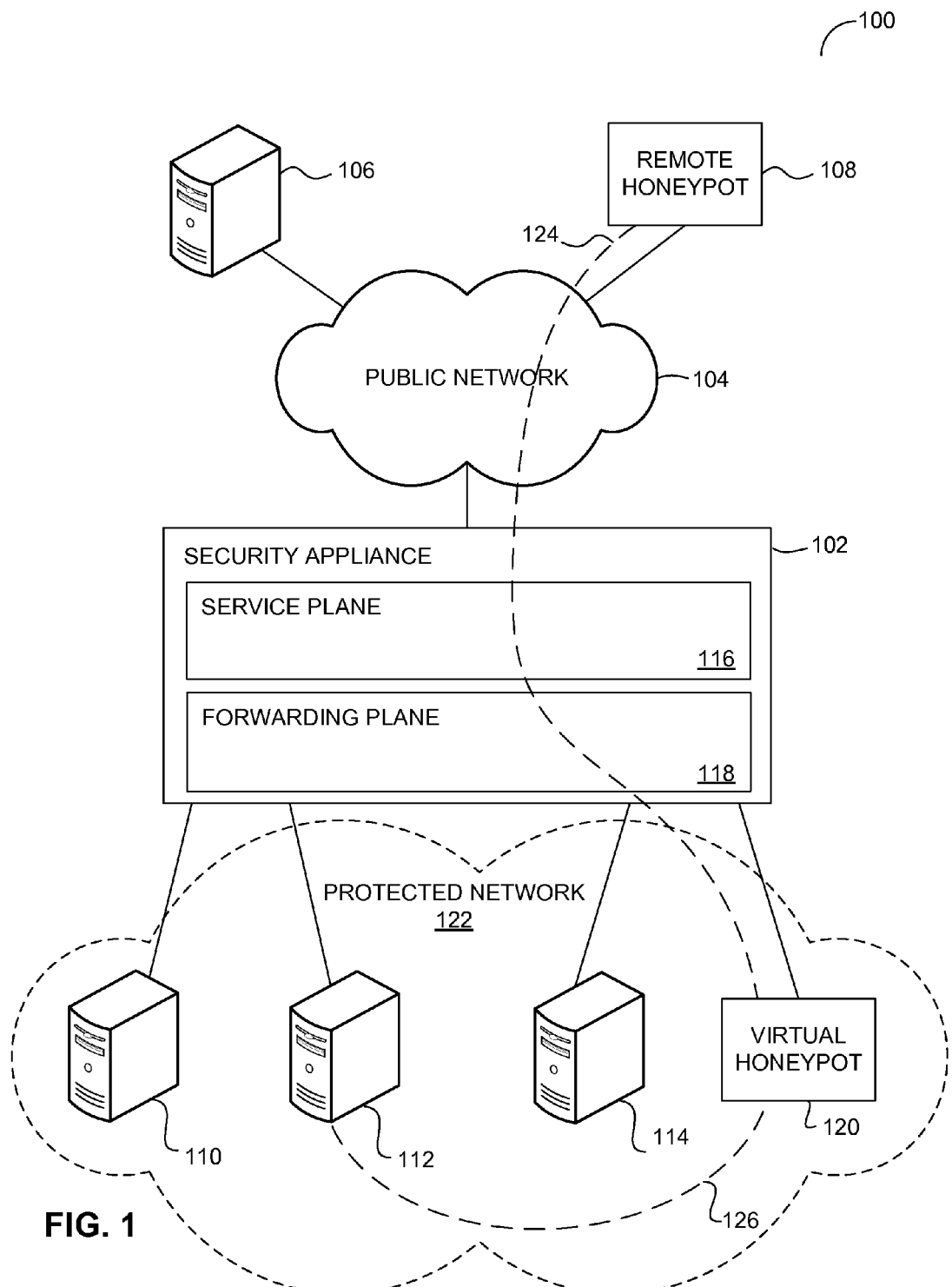
FIG. 1 is a block network diagram showing a virtual honeypot provided via a security appliance, in accordance with some examples.

Security systems, such as firewalls and antivirus software, provide significant protection in a typical network environment, in that firewalls provide defense against unauthorized access to a private network, and antivirus software provides defense against infection of individual computer systems by viruses, Trojans, rootkits, and other threats. Although such security systems provide defense against many types of computer attacks, even a careful examination of their event logs provides limited information regarding how an attack was mounted. Further, such technologies often miss many attacks and infections.

For reasons such as these, decoy systems known as honeypots are sometimes employed to gather information on an attacker or intruder. Honeypots can be set up inside or outside a private network, and are typically configured to appear as a vulnerable networked computer system, such as by using custom software configured to appear identical to a vulnerable system, or by using a standard operating system and software that may be an attractive target to an attacker, such as a Windows™ server, a database server, or other such system. The honeypot system further typically includes a software tool that enables user activity to be logged or traced, enabling the honeypot's host to gather information regarding an attacker's identity and methods.

But, configuration and installation of a honeypot system can be a complex task. It is desirable that the honeypot mimic an actual server that is attractive to an attacker, which involves installation, configuration, and maintenance of such a system, and possibly inclusion of "dummy" information such as emails, database entries, or other such false data. Tracking software is desirably set up to provide tracking of attacker activity on the honeypot system. Other configuration modifications, such as restricting outbound traffic to prevent the honeypot from being employed to attack other computer systems are also often desired, resulting in a somewhat complex installation. Further, cleaning up after a honeypot infection or attack to restore the honeypot to a pre-attack state can be a time-consuming task.

Some examples presented herein therefore provide a honeypot that is hosted remotely, and provided to a local network via a firewall or other security appliance. In one more detailed example, a security appliance uses a tunnel or virtual private network (VPN) connection to a remote honeypot system to provide a virtual honeypot that appears to be local to the security appliance. The remote honeypot may be configured by a third-party provider, such as using one of several standard configurations, reducing the burden on the security appliance operator in setting up and operating a honeypot.

In some examples, a network administrator deploys a network device, such as a security appliance, that leverages a honeypot service to dynamically offer or "stand-up" non-existent services in response to service requests made to servers within a protected network. Techniques employed by the network device are described in further detail below.

FIG. 1 is a block network diagram showing a virtual remote honeypot provided via a security appliance, consistent with some example embodiments. In the example of FIG. 1, a security appliance 102 operates within network 100, and is coupled via an external or public network 104 to one or more remote computers 106. The public network 104 further connects the security appliance 102 to a remote honeypot 108, which is operable to provide a virtual honeypot system to security appliance 102.

The security appliance 102 is also coupled to internal or private network systems, such as computers 110, 112, and 114. The security appliance includes a service plane 116 operable to configure and manage the security appliance, and a forwarding plane 118 operable to regulate the flow of traffic between the external network computers such as 106 and internal computer systems 110, 112, and 114. The security appliance provides for deploying a local virtual honeypot 120 by connecting to a remote honeypot 108 such that the security appliance and the remote honeypot are configured to emulate a local honeypot, appearing to computers coupled to the network as virtual honeypot 120.

Computers 110, 112, 114, and virtual honeypot 120 within the internal or private network are in this example part of a protected network 122, protected from public network 104 by the security appliance 102. The security appliance typically regulates or filters incoming network traffic from the public network to the protected network's computers, preventing unauthorized access, viruses, malware, and other such threats from reaching the protected network 122's computers.

In operation, the security appliance administrator configures the security appliance 102 to use a remotely hosted honeypot 108, such as a cloud-based honeypot, to simulate a locally operated honeypot system. The security appliance adds virtual endpoints, such as Internet Protocol (IP) addresses to the network, that respond to standard network discovery attempts such as Address Resolution Protocol (ARP) requests, Internet control message protocol (ICMP) pings, and other such network requests often used to find and communicate with systems on a network. The virtual honeypot 120 therefore appears to other systems such as remote computer 106 and local computers 110, 112, and 114 to be a system local to the security appliance's protected network. Security appliance 102 tunnels traffic from systems such as these destined to the virtual honeypot IP address to the remote honeypot 108, which is operable to provide a response that appears to come from a local virtual honeypot 120 via tunnel connection 124. The remote honeypot further monitors and tracks honeypot activity, and provides activity data such as activity reports to the security appliance 102's administrator so that the administrator can use the data to learn how attackers attempt to gain access to computer systems, and can gather forensic evidence to aid in the identification and prosecution of attackers. Further, honeypots may divert attacks from real infrastructure systems, effectively diverting dangerous activity away from sensitive networked assets.

The honeypot in various examples includes mail servers, database servers, or other systems that provide information or services that may be attractive to an attacker. Although some honeypots may include minimal resources, such as only those most likely to be accessed by an attacker, others will appear to be fully operational systems, using standard operating systems and other software, making them more difficult for an attacker to recognize as a potential honeypot.

Virtual honeypot 120 in various examples may be located on the internal or private network side of the security appliance 102 as shown at 120, or virtual honeypot 120 may be located on the external or public side of the firewall, such as is often the case with application or web servers and other such systems. In examples where security appliance 120 exposes virtual honeypot 120 inside the internal protected network, such as is shown in FIG. 1, the virtual honeypot may also monitor for internal threats, such as virus or Trojan attacks from another computer on the private network such as computer 112 which is coupled to the virtual honeypot by network connection 126.

Because the virtual honeypot system should receive very little traffic on an internal network as it does not provide actual network services to typical users, a pattern of unusual traffic from an infected computer 112 to an internal virtual honeypot 120 may provide an indication of a security threat that is not identified by other means such as antivirus software, enabling the network administrator to more quickly find and respond to the threat. In addition, while described with respect to a security appliance, such as an intrusion detection and prevention, universal threat management, and/or firewall device, the techniques may be applied by other types of network devices, such as routers, layer 3 (L3) switches, layer 2/layer 3 (L2/L3) switches, and other devices capable of tunneling traffic to remote honeypot 108, including L3 traffic.

Employing a remote honeypot to provide a virtual honeypot enables efficient use of remote server resources to provide virtual honeypots to several different security appliances, sharing server resources with other virtual honeypots that are rarely accessed by remote computers. Use of a remote or cloud-based honeypot service further offloads configuration and management of the honeypot from the local security appliance or another local machine to a remotely hosted system. The remotely hosted honeypot service provider can therefore provide several different standard base configurations from which a customer may choose, and which can serve as a base configuration for further customization if desired.

Figure 2:
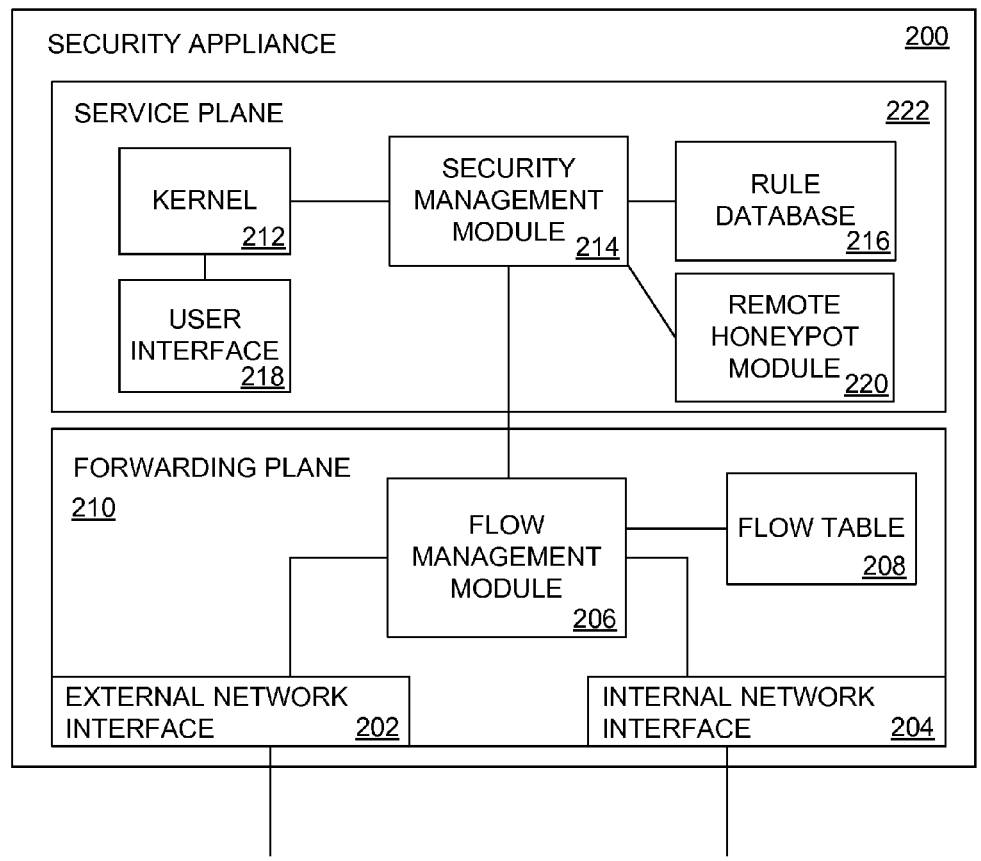
FIG. 2 is a block diagram of a security appliance operable to provide a virtual remote honeypot, in accordance with some examples.

FIG. 2 is a block diagram of a security appliance operable to provide a virtual honeypot, consistent with some example embodiments. Here, a security appliance 200 includes an external network interface 202, an internal network interface 204, flow management module 205, and flow table 208 as part of a forwarding plane 210 that is operable to manage the flow of traffic through the security appliance. An operating system kernel 212, security management module 214, rule database 216, user interface 218, and honeypot module 220 are included in service plane 222, which is operable to manage the security appliance.

An administrator uses user interface 218 to access and configure the security management module 214, such as to update or configure rules in rule database 216, to apply various rules from rule database 216 to packet flows, to bind various applications to various ports, or to otherwise configure the operation of security appliance 200. The administrator may also configure the security appliance to utilize a remote honeypot service via remote honeypot module 220.

The forwarding plane 210 monitors traffic between the external network interface 202 and internal network interface 204 through flow management module 206, which uses rules from rule database 216, information regarding the configured network addresses of a virtual honeypot configured through remote honeypot module 220, and other such configuration information stored in flow table 208 to regulate the flow of network traffic through the security device. In some more detailed examples, flow management module 206 further provides some inspection of network packets, such as stateful inspection of packets based on the network connections associated with various packets, and is therefore operable to decode and monitor packets having various network protocols.

The various security appliance elements of FIG. 2 in various examples may include any combination of hardware, firmware, and software for performing the various functions of each element. For example, kernel 212 and security management module 204 may include software instructions that run on a general-purpose processor, while flow management module 206 includes an application-specific integrated circuit (ASIC). In another example, flow management module 206 executes as a process on a processor, along with security management module 214, kernel 212, and user interface 218. In still other embodiments, various elements of security appliance 200 may include discrete hardware units, such as digital signal processors (DSPs), application specific integrated circuits (ASICs), field programmable gate arrays (FPGAs), or any other equivalent integrated or discrete logic circuitry, or any other combination of hardware, firmware, and/or software.

In general, flow management module 206 determines, for packets received via input network interface 202, a packet flow to which the packets belong and characteristics of the packet flow. When a packet flow is first received, flow management module 206 constructs a state update including information regarding the packet such as the five-tuple {source IP address, destination IP address, source port, destination port, protocol}, and in some examples, an indication of how transactions are differentiated. Flow management module 206 receives inbound traffic through external network interface 202 and identifies network flows within the traffic. Each network flow represents a flow of packets in one direction within the network traffic and is identified by at least a source address, a destination address and a communication protocol. Flow management module 206 may utilize additional information to specify network flows, including source media access control (MAC) address, destination MAC address, source port, and destination port. Other examples may use other information to identify network flows, such as IP addresses.

Flow management module 206 maintains data within flow table 208 that describes each active packet flow present within the network traffic. Flow table 208 specifies network elements associated with each active packet flow, i.e., low-level information such as source and destination devices and ports associated with the packet flow. In addition, flow table 208 identifies pairs or groups of packet flows that collectively form a single communication session between a client and server. For example, flow table 208 may designate communication session as pairs of packet flows in opposite directions for flows sharing at least some common network addresses, ports and protocol.

The flow management module in a further example provides stateful inspection of packet flows to identify attacks within packet flows. When flow management module 206 detects an attack, it executes a programmed response, such as sending an alert to security management module 214 for logging or further analysis, dropping packets of the packet flow, or ending the network session corresponding to the packet flow. The flow management module may also block future connection requests originating from a network device having an identifier associated with a determined attack. In a further example, flow management module provides application-level inspection of packets, such as to allow HTTP traffic from web browsing while blocking HTTP traffic from file sharing applications.

The administrator may configure the security appliance to provide a virtual honeypot by configuring remote honeypot module 220 via user interface 218, such as by specifying a network address of the desired virtual honeypot or other characteristics of the virtual honeypot. Other characteristics may include specifying network services, e.g., ICMP, ARP, that the virtual honeypot is to support on the network. The remote honeypot module 220 creates a virtual honeypot having one or more network addresses local to the security appliance 200, and establishes a connection to a remote honeypot server such as 108 of FIG. 1. The security appliance monitors the network for packets destined to network addresses with the virtual honeypot via flow management module 206 using rules configured in flow table 208, and forwards such traffic to the remote honeypot such as via a network tunnel connection or virtual private network (VPN) connection between the security appliance 200 and the remote honeypot.

The security appliance is therefore operable to make it appear to other networked computer systems that the virtual honeypot is an actual server that is local to the security appliance 200, making it an attractive target for attackers. Although the virtual honeypot is shown in FIG. 1 at 120 to be a single virtual system, in other examples it may be a network segment or subnet, or an elaborate virtual network environment configured to attract the attention of attackers.

The security appliance in the example of FIG. 2 in many examples may lack the processing power, storage, or other computing resources to execute a honeypot with the security appliance. Security appliance 200, as described above, therefore relies upon a remotely hosted honeypot. The security appliance 200 uses the remote honeypot module 220 to configure network addresses to make it appear as though the remote honeypot exists locally on a network protected by security appliance 200. In some examples, however, security appliance 200 does not provide a full range of network connectivity for the virtual honeypot. Although security appliances such as 200 are often configured to restrict traffic inbound to local systems, the security appliance in this example may be configured to restrict traffic outbound from the virtual honeypot, preventing it from being taken over in an attempt to distribute malware, spam, or other security threats. In another example, management software running on the virtual honeypot works to prevent outbound network traffic that may pose a threat to other computer systems. Such network traffic blocking mechanisms in a more detailed example are configured to make it appear as though network traffic can be successfully sent from the honeypot system, thereby making it appear to be a fully operational network system.

Figure 3:
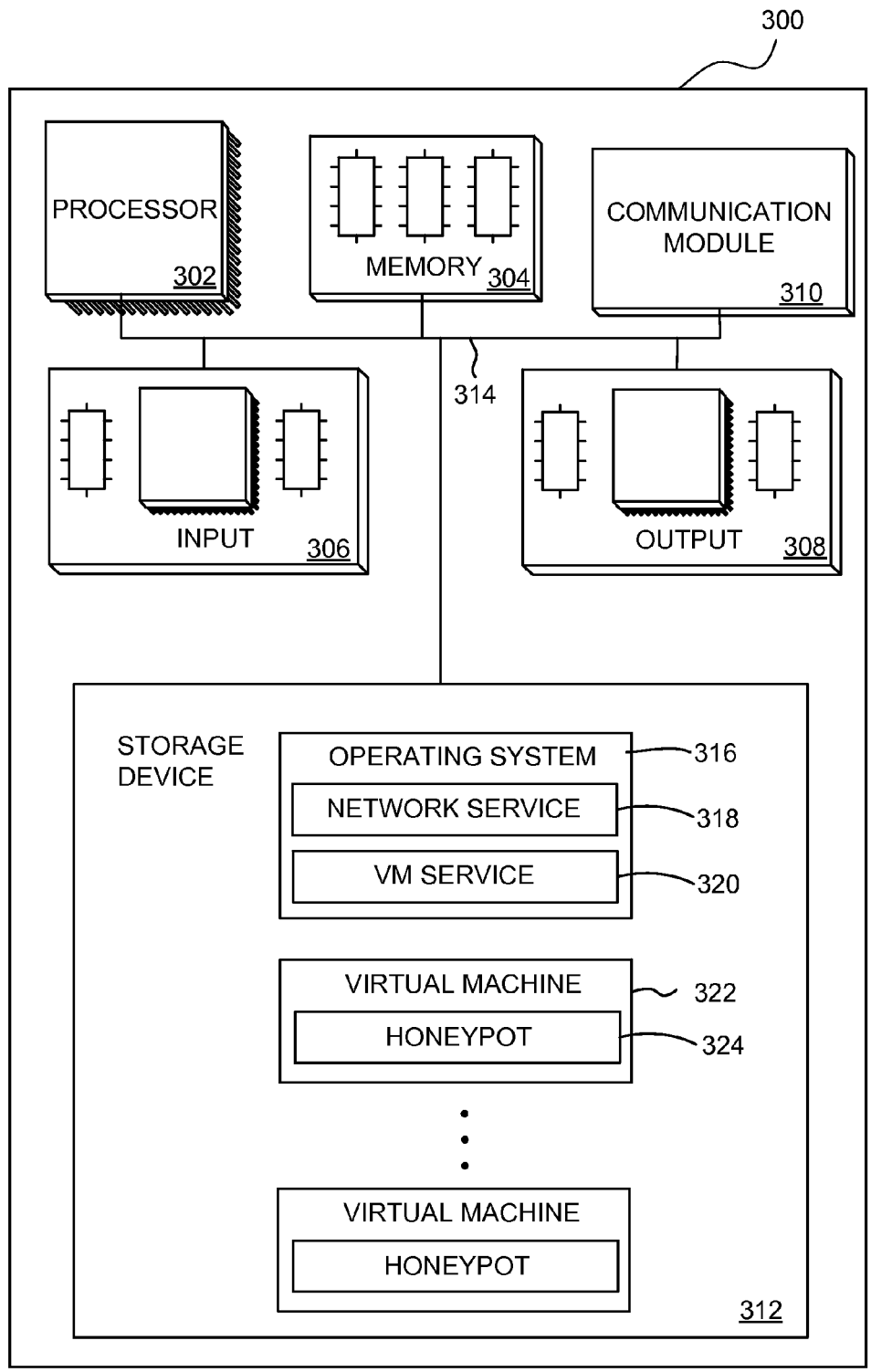
FIG. 3 shows a block diagram of a computerized system as may be used to provide a remote honeypot, security appliance, or other network device, in accordance with examples herein.

FIG. 3 shows a block diagram of a computerized system as may be used to provide a remote honeypot, security appliance, or other network device, consistent with examples herein. FIG. 3 illustrates only one particular example of computing device 300, and many other examples of computing device 300 may be used in other embodiments, such as to provide a remote virtual honeypot or security appliance consistent with various example embodiments.

As shown in the specific example of FIG. 3, computing device 300 includes one or more processors 302, memory 304, one or more input devices 306, one or more output devices 308, one or more communication modules 310, and one or more storage devices 312. Computing device 300, in one example, further includes an operating system 316 executable by computing device 300. The operating system includes in various examples services such as a network service 318 and a virtual machine (VM) service 320. One or more virtual machines, such as virtual machine 322 are also stored on storage device 312, and are executable by computing device 300. Each of the virtual machines such as 322 may further execute a honeypot server 324. Each of components 302, 304, 306, 308, 310, and 312 may be interconnected (physically, communicatively, and/or operatively) for inter-component communications, such as via one or more communications channels 314. In some examples, communication channels 314 include a system bus, network connection, interprocess communication data structure, or any other channel for communicating data. Applications such as virtual machine 322 and operating system 316 may also communicate information with one another as well as with other components in computing device 300.

Processors 302, in one example, are configured to implement functionality and/or process instructions for execution within computing device 300. For example, processors 302 may be capable of processing instructions stored in storage device 312 or memory 304. Examples of processors 302 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 312 may be configured to store information within computing device 300 during operation. Storage device 312, in some examples, is described as a computer-readable storage medium. In some examples, storage device 312 is a temporary memory, meaning that a primary purpose of storage device 312 is not long-term storage. Storage device 312, in some examples, is described as a volatile memory, meaning that storage device 312 does not maintain stored contents when the computer is turned off. In other examples, data is loaded from storage device 312 into memory 304 during operation. Examples of volatile memories include random access memories (RAM), dynamic random access memories (DRAM), static random access memories (SRAM), and other forms of volatile memories known in the art. In some examples, storage device 312 is used to store program instructions for execution by processors 302. Storage device 312 and memory 304, in various examples, are used by software or applications running on computing device 300 (e.g., virtual machines 322) to temporarily store information during program execution.

Storage devices 312, in some examples, also include one or more computer-readable storage media. Storage devices 312 may be configured to store larger amounts of information than volatile memory. Storage devices 312 may further be configured for long-term storage of information. In some examples, storage devices 312 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 300, in some examples, also includes one or more communication units 310. Computing device 300, in one example, utilizes communication unit 310 to communicate with external devices via one or more networks, such as one or more wireless networks. Communication unit 310 may be a network interface card, such as an Ethernet card, an optical transceiver, a radio frequency transceiver, or any other type of device that can send and/or receive information. Other examples of such network interfaces may include Bluetooth, 3G and WiFi radios computing devices as well as Universal Serial Bus (USB). In some examples, computing device 300 utilizes communication unit 310 to communicate with an external device such as security appliance 102 of FIG. 1, or any other computing device.

Computing device 300, in one example, also includes one or more input devices 306. Input device 306, in some examples, is configured to receive input from a user through tactile, audio, or video feedback. Examples of input device 306 include a touchscreen display, a mouse, a keyboard, a voice responsive system, video camera, microphone or any other type of device for detecting input from a user.

One or more output devices 308 may also be included in computing device 300. Output device 308, in some examples, is configured to provide output to a user using tactile, audio, or video stimuli. Output device 308, in one example, includes a presence-sensitive touchscreen display, a sound card, a video graphics adapter card, or any other type of device for converting a signal into an appropriate form understandable to humans or machines. Additional examples of output device 308 include a speaker, a light-emitting diode (LED) display, a liquid crystal display (LCD), or any other type of device that can generate output to a user. In some examples, input device 306 and/or output device 308 are used to provide operating system services, such as graphical user interface service 318, such as via a display.

Computing device 300 may include operating system 316. Operating system 316, in some examples, controls the operation of components of computing device 300, and provides an interface from various applications such as virtual machine 322 to components of computing device 300. For example, operating system 316, in one example, facilitates the communication of virtual machine 322 with processors 302, communication unit 310, storage device 312, input device 306, and output device 308. As shown in FIG. 3, virtual machine 322 may include a honeypot 324 executing thereon, as shown at 108 in FIG. 1. Applications such as 322 may each include program instructions and/or data that are executable by computing device 300. As one example, virtual machine 322 and honeypot 324 include instructions that cause computing device 300 to perform one or more of the operations and actions described herein.

A variety of different honeypots 324 may be configured to run on a single server, or distributed across different servers in various examples. This is achieved in some examples by executing different virtual machines 322 on a server, and executing a different instance of a honeypot in each virtual machine. This enables a remote honeypot server to provide a variety of different virtual honeypots, and to add or remove different virtual honeypots as needed, to support a variety of different enterprise customer requirements.

Although computing device 300 is in this example a remote honeypot server, in other examples it may perform other functions described herein, such as executing the service plane and forwarding plane of a security appliance as shown and described in FIG. 2.

The methods described herein may be implemented, at least in part, in hardware, software, firmware, or any combination thereof. For example, the described methods may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the methods described herein.

Such hardware, software, and firmware may be implemented within the same device or within separate devices to support the various methods described herein. In addition, any of the described units, modules or components may be implemented together or separately as discrete but interoperable logic devices. Depiction of different features as modules or units is intended to highlight different functionality and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The methods described herein may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in memory or nonvolatile memory).

Figure 4:
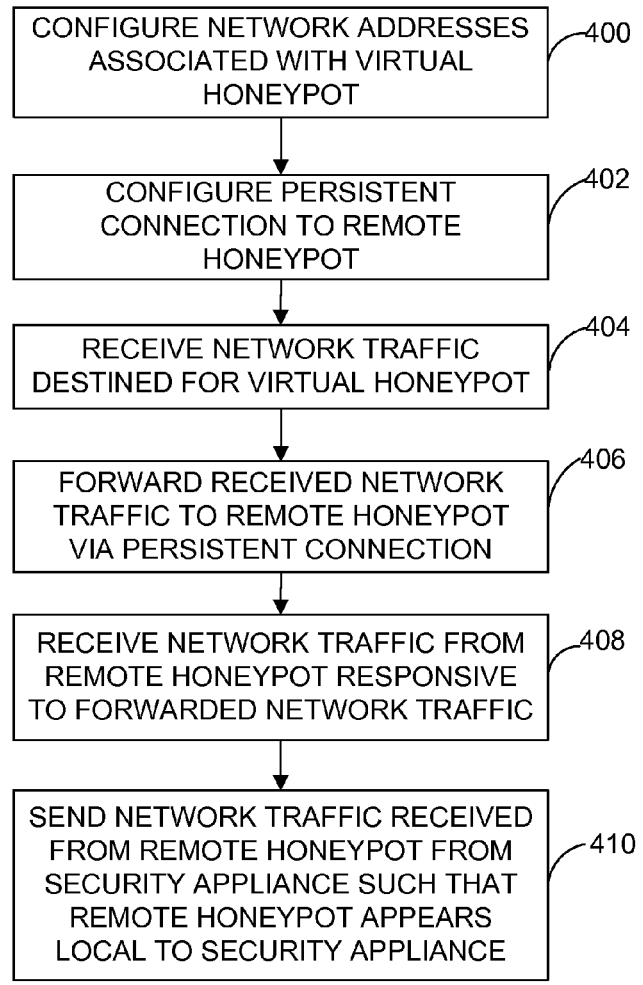
FIG. 4 is a flowchart of a method of operating a security appliance to provide a virtual honeypot using a remote honeypot server, in accordance with some examples.

FIG. 4 is a flowchart of a method of operating a security appliance to provide a virtual honeypot using a remote honeypot server, consistent with an example embodiment. One or more network addresses for the virtual honeypot are configured at 400, such as one or more Internet protocol (IP) or media access control (MAC) addresses, which are addresses on a network local to the security appliance. In further examples, the addresses are within a private or internal network coupled to the security appliance, or are on a public or external network coupled to the security appliance.

The security appliance establishes a communication session to a remote honeypot server at 402, such as a remotely-hosted honeypot server, a cloud-based honeypot service, or another type of remote honeypot system. The security appliance receives network traffic destined for the virtual honeypot at 404, such as by monitoring the network for traffic destined to the network addresses configured to be associated with the virtual honeypot at 400. The traffic in a further example comes from a potential attacking computer system, such as a remote client system as shown at 106 of FIG. 1, or a local system that may be infected with malware or otherwise used to mount an attack as shown at 112 and 124 of FIG. 1. The security appliance forwards received network traffic destined for the virtual honeypot to the remote honeypot at 406, via the communication session between the security appliance and the remote honeypot created at 402. The communications session in various examples is a network tunnel, a virtual private network, or another such network connection.

The remote honeypot receives the network traffic from the security appliance and sends network traffic in response, which the security appliance receives at 408. For example, the remote honeypot operating at least in part to expose an email server may return email account information in response to an email query, the remote honeypot operating at least in part to expose a database server may return database information in response to a database query, or the remote honeypot may enable a user to log on and explore configuration, logs, and applications that may be found in a typical network environment by responding to user interface commands or other commands received through the security appliance.

The security appliance forwards the responsive traffic received from the remote honeypot at 410, such as to a potential attacking computer system, using the network address associated with the virtual honeypot such that the remote honeypot appears to be a computer system local to the security appliance. That is, the security appliance proxies the traffic received from the remote honeypot with the virtual honeypot interface (e.g., network address) exposed by the security appliance to the network in order to emulate a honeypot existing within the network secured by the security appliance. An attacker therefore sees the virtual honeypot provided by the security appliance as simply another server on the network, and is unaware that the server is a virtual honeypot provided by a remote honeypot server via the security appliance.

In further embodiments, the security appliance is operable to perform other functions, such as send configuration settings to the remote honeypot, receive report information from the remote honeypot, and select one or more types of honeypot servers available for configuration.

Figure 5:
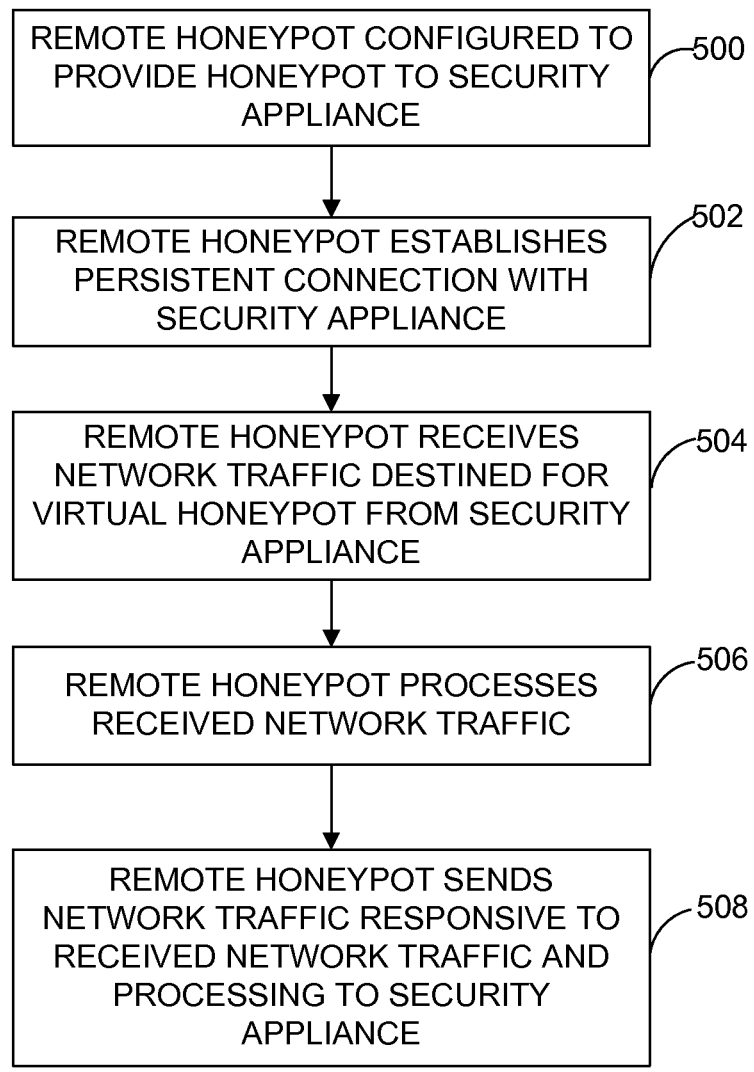
FIG. 5 is a flowchart of a method operating a remote honeypot server to provide a virtual honeypot service to a security appliance, in accordance with some examples.

FIG. 5 is a flowchart of a method of operating a remote honeypot server to provide a virtual honeypot service to a security appliance, consistent with an example embodiment. The remote honeypot server may be an example of remote honeypot server 108 of FIG. 1, for instance. A remote honeypot is configured to provide a honeypot to a security appliance at 500, such as by receiving a configuration request from the security appliance, receiving a subscription or payment for a honeypot service that is associated with the security appliance or security appliance administrator, or otherwise receiving an indication that a honeypot is desired to be linked to the security appliance.

A persistent network connection is established between the remote honeypot and the security appliance at 502, such as a tunnel or virtual private network connection between the security appliance and a virtual machine executing the remote honeypot. The remote honeypot receives network traffic destined for a virtual honeypot hosted by the security appliance at 504, such as by the security appliance receiving traffic destined to a network address or service provided by the virtual honeypot hosted by the security appliance, and forwarding the received traffic to the remote honeypot.

The remote honeypot processes the received network traffic at 506, such as by providing an interactive server through a graphical or command line user interface, providing network services such as NetBIOS, Internet Control Message Protocol (ICMP) ping, address resolution protocol (ARP) request, MAC address, Internet Protocol address, or Windows workgroup services, or providing server functions such as an email server, a database server, a file server, a web server, or Windows server.

The remote honeypot then sends network traffic to the security appliance responsive to the received traffic at 508 over the persistent connection, such as sending the results of a service query, a user interface input, or other server response to the received network traffic. The responsive network traffic is formatted such that the security appliance is operable to receive the traffic from the remote honeypot, and provide the traffic to a potential attacker or other system attempting to access the virtual honeypot hosted via the security appliance.

This enables the security appliance and the remote honeypot to work together to provide a virtual honeypot that appears to be connected to a network local to the security appliance, to detect and track attempts to access various resources or services provided via the honeypot system. The security appliance is operable to provide a virtual honeypot by capturing traffic to and from network addresses, resource names, or other identifiers associated with the virtual honeypot, and exchanging information with a remote honeypot server so it appears that a honeypot server is operating local to the security appliance.

Figure 6:
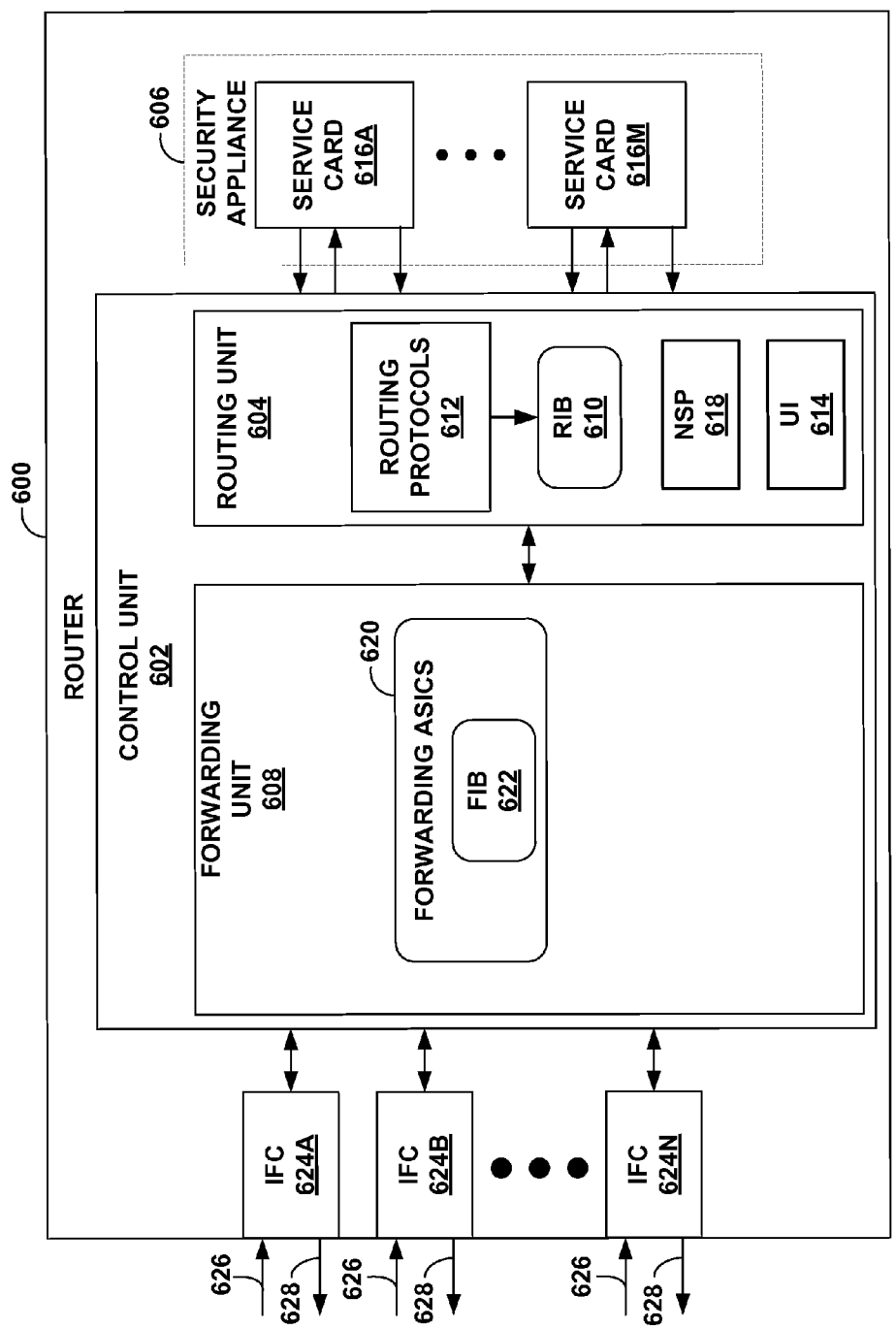
FIG. 6 is a block diagram of a router that integrates a security appliance operable to provide a virtual honeypot, in accordance with some examples.

FIG. 6 is a block diagram of a router that integrates a security appliance operable to provide a virtual honeypot, in accordance with some example embodiments. Here, an example router 600 includes a control unit 602 that includes a routing unit 604, a security appliance, 606, and a forwarding unit 608. Routing unit 604 is primarily responsible for maintaining routing information base (RIB) 610 to reflect the current topology of a network and other network entities to which it is connected. In particular, routing unit 604 periodically updates RIB 610 to accurately reflect the topology of the network and other entities. Routing engine 604 also includes routing protocols 612 that perform routing operations, including protocols for establishing tunnels, such as VPNs and optionally LSPs, through a network.

UI module 614 represents software executing on routing unit 604 that presents a command line interface (e.g., via a shell or Telnet session) for receiving configuration data as described herein, including configuration data defining one or more interfaces for a virtual honeypot presented by router 600 to a network and for application by service cards 616 of security appliance 606. Network services process (NSP) 618 of routing unit 604 communicates with and programs service cards 616A-616M of security appliance 606.

In accordance with RIB 610, forwarding application specific integrated circuits (ASICs) 620 of forwarding unit 608 maintain forwarding information base (FIB) 622 that associates network destinations or MPLS labels with specific next hops and corresponding interface ports. For example, control unit 602 analyzes RIB 610 and generates FIB 622 in accordance with RIB 610. Router 600 includes interface cards 624A-624N ("IFCs 624") that receive and send packets via network links 626 and 628, respectively. IFCs 624 may be coupled to network links 626, 628 via a number of interface ports.

In some examples, routing unit 604 in accordance with commands received by UI 614 programs FIB 622 to include a forwarding next hop for the virtual honeypot interfaces. In addition, routing unit 604 programs service card 616A, which may represent a tunnel PIC, to proxy virtual honeypot traffic with a remote honeypot. Forwarding ASICs 620 apply FIB 622 to direct traffic that is received by IFCs 624 and destined virtual honeypot interfaces to service card 616A, which tunnels the traffic to the remote honeypot. Service card 616A receives responsive traffic and forwards the responsive traffic to forwarding unit 608 for output via IFCs 624. In this way, router 600 may provide high-performance honeypot emulation in conjunction with the remote honeypot. In some examples, routing unit 604 programs FIB 622 to include a tunneling interface, e.g., a VPN interface, for virtual honeypot traffic. Consequently, forwarding ASICs 620 apply FIB 622 to directly tunnel virtual honeypot traffic to the remote honeypot.

In one embodiment, each of forwarding unit 608 and routing unit 604 may include one or more dedicated processors, hardware, ASICs or the like, and may be communicatively coupled by a data communication channel. The data communication channel may be a high-speed network connection, bus, shared-memory or other data communication mechanism. Router 600 may further include a chassis (not shown) for housing control unit 602. The chassis has a number of slots (not shown) for receiving a set of cards, including IFCs 624 and service cards 616. Each card may be inserted into a corresponding slot of the chassis for electrically coupling the card to control unit 602 via a bus, backplane, or other electrical communication mechanism.

Router 600 may operate according to program code having executable instructions fetched from a computer-readable storage medium (not shown). Examples of such media include random access memory (RAM), read-only memory (ROM), non-volatile random access memory (NVRAM), electrically erasable programmable read-only memory (EEPROM), flash memory, and the like. The functions of router 600 may be implemented by executing the instructions of the computer-readable storage medium with one or more processors, discrete hardware circuitry, firmware, software executing on a programmable processor, or a combination of any of the above.

Figure 7:
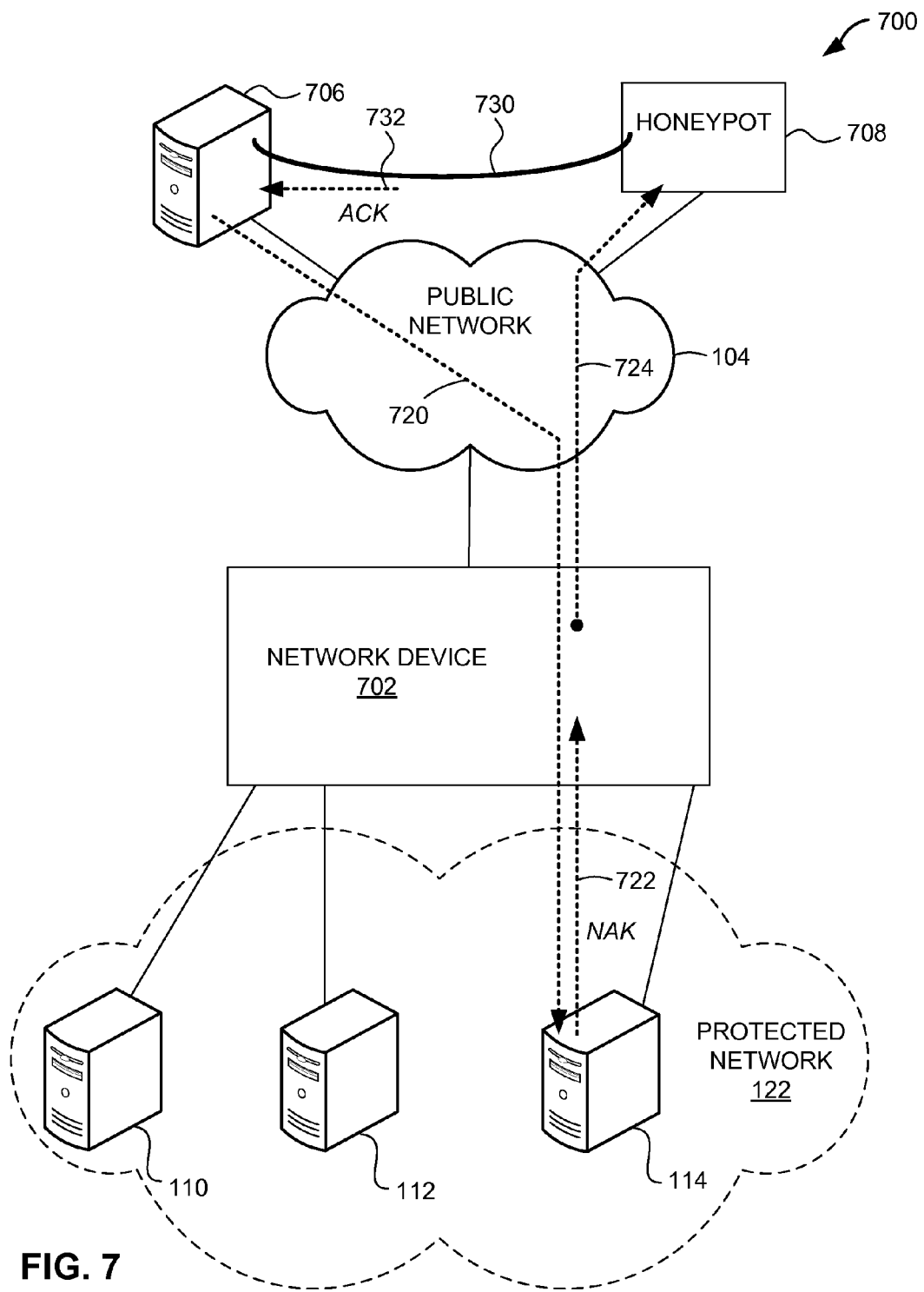
FIG. 7 is a block diagram illustrating an example network system in which a network device leverages a honeypot to dynamically imitate service interactions for a service not provided by a network served by the network device.

FIG. 7 is a block diagram illustrating an example network system in which a network device leverages a honeypot to dynamically imitate service interactions for a service not provided by a network served by the network device. In the illustrated example, network system 700 includes protected network 122 including servers 110, 112, and 114. As described above with respect to FIG. 1, each of servers 110, 112, and 114 may each provide one or more services. Client devices may request services by issuing corresponding service requests that specify a server and a service. The specified server may or may not provide the service specified in a service request, however. In response to receiving a service request that specifies a service not provided by a specified server, the servers 110, 112, and 114 may send an explicit denial of service response or simply drop the service request (i.e., refrain from responding).

Requested services, as described herein, refer to network services that are applications running at the application layer (layer 7) to provide, e.g., data storage, manipulation, presentation, communication, or other capabilities. Example network services include e-mail, HyperText Transfer Protocol (HTTP), File Transfer Protocol (FTP) or other file sharing, instant messaging, web services, time services, Simple Network Management Protocol (SNMP), Video-on-Demand (VoD), Voice-over-IP (VoIP) or other network-based telephony, printing, file server, directory services, gaming, and so forth. Although primarily described with respect to a client-server architecture, the services may be provided according to a peer-to-peer architecture in which servers 110, 112, and 114 and client device 706 may execute a peer-to-peer application that communicates using network service using a particular transport layer protocol and port.

Servers 110, 112, and 114 offer the services on ports associated with a transport layer protocol, such as Transmission Control Protocol (TCP) and User Datagram Protocol (UDP), as well as Internet Control Message Protocol (ICMP), various routing protocols, Generic Routing Encapsulation (GRE), and so forth. Such protocols may be identified in IP headers of service requests and service traffic. The transport layer is alternatively referred to as layer 3. Although a service is typically associated with a single transport layer protocol and single port for that protocol, a given service may be associated with multiple ports and/or multiple transport layer protocols. In addition, multiple different services may be associated with the same transport layer protocol port. For instance, HTTP servers typically provide the HTTP service on TCP port 80. FTP is typically associated with a TCP or UDP port 20 data channel and a TCP port 21 control channel. The Internet Assigned Numbers Authority (IANA) maintains the official assignments of port numbers for network services, but services need not necessarily adhere to the official assignments.

Client computing device 706 (hereinafter, "client device 706") requests a service by issuing service request 720 to server 114. Service request 720 may specify a network layer (i.e., layer 3 or "L3") or other address of server 114, a transport layer protocol, and a port for the transport layer protocol. Server 114 may have its own address (e.g., IPv4 address) or may be load-balanced with at least one of servers 110 and 112 to have an address in common. Service request 720 may represent a TCP SYN ("Synchronize"), a TCP non-SYN for a session for which no TCP SYN has been received, or a UDP datagram, for instance. A TCP SYN is a TCP packet with the SYN flag set. A TCP non-SYN is a TCP packet without the SYN flag set. The service request 720 may specify a requested service by a value of a destination port field for the TCP packet or UDP datagram, for instance. For example, a TCP SYN with a destination port value of 80 is a service request for an HTTP service.

Network device 702 is situated along a forward path from client device 706 to server 114 and thus receives service request 720. Network device 702 may represent a router; switch; security appliance such as a firewall, unified threat management device, an intrusion detection system, an intrusion prevention system; or any combination of the above, for example. Although illustrated as logically located on the border of the protected network 122, network device 702 may be located anywhere on the forwarding path between client device 706 and server 114. For example, network device 702 may be logically located within either public network 104 or protected network 122.

In accordance with techniques described herein, network device 702 determines based on actions or non-actions of server 114 that server 114 does not provide the service requested by service request 720. In other words, network device 702 determines that the requested service is non-existent. In some example, network device 702 may store records of service requests received, including service request 720, in a table or other data structure. Network device 702 may then determine that the requested service is non-existent based on the expiry of a wait timer without network device 702 having received a positive indication that server 114 provides the service requested by service request 720. The wait timer may be configurable by an administrator of network device 702. The expiry of the wait timer indicates that a positive indication that server 114 provides the service requested is not forthcoming and, therefore, network device 702 may assume that the requested service is not offered by server 114.

In the illustrated example, network device 702 receives an explicit negative indication in the form of a negative service response 722 from server 114 and responsive to service request 720. The negative service response 722 indicates that server 114 does not provide the service specified by service request 720. Service response 722 may represent a SYN RST, for instance. A SYN RST is a SYN packet with the RST ("Reset") flag set.

Whereas a positive indication from server 114 such as a TCP SYN ACK or a UDP datagram directed to client device 706 indicates server 114 provides the service specified by service request 720, the example negative indications based on actions or non-actions of server 114 provided above indicate that server 114 does not provide the service specified by service request 720. In response to the negative indication, network device 702 sends service request 724 to a honeypot 708, which processes the service request 724.

Service request 724 may be a representation of service request 720 and indicates to honeypot 708 that network device 702 has received a service request specifying a non-existent service within protected network 122. For example, service request 724 may be a copy of service request 720 or more simply a definition of the service requested by service request (e.g., a combination of address, port, and protocol).

Honeypot 708 may dynamically offer or "stand-up" the requested service in order to imitate the service to client device 706, in some instances according to policies configured for honeypot 708. In other words, honeypot 708 may communicate with client device 706 such that client device 706 considers the traffic issued from honeypot 708 as being issued by server 114 for the service specified in service request 720. In the example of FIG. 7, honeypot 708 processes service request 724 to establish a service session 730 with 706. Where the service specified by service request 720 is a TCP-based service, service connection 730 may represent a TCP session. Where the service specified by service request 720 is for a UDP-based service, service session 730 may represent a UDP session in which honeypot 708 issues UDP datagrams to client device 706. Service session 730 may represent multiple TCP sessions and/or UDP sessions.

In some cases, network device 702 issues a service response having a positive indication to client device 706 in response to determining a negative indication from server 114 for the service request 720. For example, network device 702 may issue a TCP SYN ACK to client device 706. Service response 732 illustrates an example of a positive indication sent to client device 706 in response to service request 720. In some cases, honeypot 708 issues the service response 732 having a positive indication in response to service request 720, rather than network device 702.

In some examples, network device 800 may operate as a proxy for service session 730, e.g., as a TCP proxy. When operating as a proxy, network device 800 terminates respective service sessions (e.g., TCP connections) with client device 706 and honeypot 708 to emulate the overall service session 708. In operating as a proxy, network device 800 may imitate the source address for the service session with client device 706 with the address of server 114. In some examples, honeypot 708 spoofs the address of server 114 in communications for service session 730. As a result, client device 706 may be unable to determine that communications for service session 730 are originated by honeypot 708 (and in some cases proxied by network device 702). Reference herein to addresses of network device 702, client device 706, server 114, and honeypot 708 may refer to layer 3 addresses.

Honeypot 708 may in many respects be similar to remote honeypot 108. Although illustrated as located outside of protected network 122, honeypot 708 may be located within protected network 122, communicatively-coupled to or a component of network device 702, or located within a demilitarized zone (DMZ) for protected network 122, for example. For instance, honeypot 708 may represent a service card of network device 702.

Figure 8:
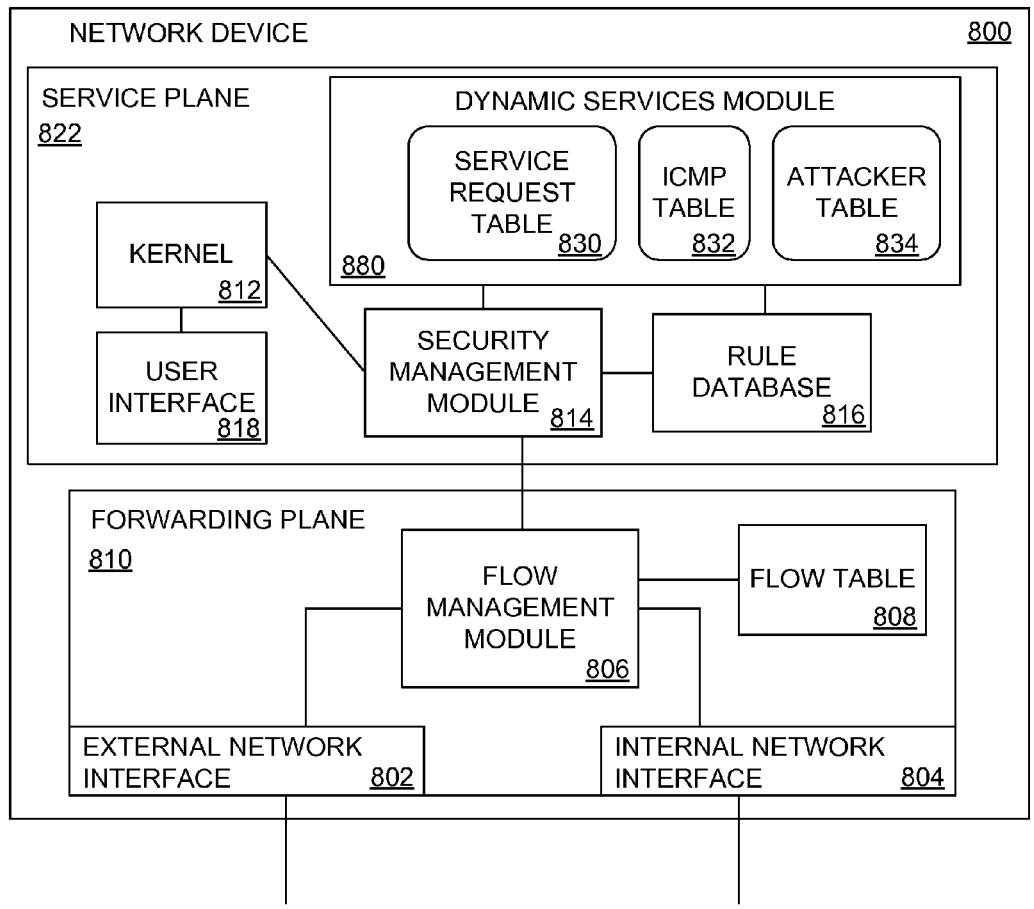
FIG. 8 is a block diagram illustrating, in further detail, an example network device that leverages a honeypot to dynamically offer non-existent services in response to service requests, according to techniques described herein.

FIG. 8 is a block diagram illustrating, in further detail, an example network device that leverages a honeypot to dynamically offer non-existent services in response to service requests, according to techniques described herein. Network device 800 may represent an example instance of network device 702 of FIG. 7. As described above with respect to FIG. 6, network device 800 may represent a security appliance 606 being executed by one or more service cards 616 of a router 600.

In this example, network device 800 includes an external network interface 802, an internal network interface 804, flow management module 805, and flow table 808 as part of a forwarding plane 810 that is operable to manage the flow of traffic through the network device. An operating system kernel 812, security management module 814, rule database 816, user interface 818, and dynamical services module 880 are included in service plane 822, which manages overall operations of network device 800.

An administrator uses user interface 818 to access and configure the security management module 814, such as to update or configure rules in rule database 816, to apply various rules from rule database 816 to packet flows, to bind various applications to various ports, or to otherwise configure the operation of network device 800. The administrator may also configure the network device 800 such that dynamic services module 880 may leverage a honeypot to offer requested services on-the-fly. User interface 818 may represent a command-line or graphical user interface, a simple network management protocol (SNMP), NETCONF, CORBA, or other interface by which an administrator may configure, e.g., rule database 816.

The forwarding plane 810 monitors traffic between the external network interface 802 and internal network interface 804 through flow management module 806, which uses rules from rule database 816, information regarding dynamic service provisioning by dynamic services module 880, and information stored in flow table 808 to process network traffic. In some more detailed examples, flow management module 806 further provides some inspection of network packets, such as stateful inspection of packets based on the network connections associated with various packets, and is therefore operable to decode and monitor packets having various network protocols.

The various elements of FIG. 8 in various examples may include any combination of hardware, firmware, and software for performing the various functions of each element. For example, kernel 812 and security management module 804 may include software instructions that run on a general-purpose processor, while flow management module 806 may include an application-specific integrated circuit (ASIC). In another example, flow management module 806 executes as a process on a processor, along with security management module 814, kernel 812, and user interface 818. In still other embodiments, various elements of network device 800 may include discrete hardware units, such as digital signal processors (DSPs), application specific integrated circuits (ASICs), field programmable gate arrays (FPGAs), or any other equivalent integrated or discrete logic circuitry, or any other combination of hardware, firmware, and/or software.

In general, flow management module 806 determines, for packets received via input network interface 802, a packet flow to which the packets belong and characteristics of the packet flow. When a packet flow is first received, flow management module 806 constructs a state update including information regarding the packet such as the five-tuple {source IP address, destination IP address, source port, destination port, protocol}, and in some examples, an indication of how transactions are differentiated. Flow management module 806 receives inbound traffic through external network interface 802 and identifies network flows within the traffic. Each network flow represents a flow of packets in one direction within the network traffic and is identified by at least a source address, a destination address and a communication protocol. Flow management module 806 may utilize additional information to specify network flows, including source media access control (MAC) address, destination MAC address, source port, and destination port.

Flow management module 806 maintains data within flow table 808 that describes each active packet flow present within the network traffic. Flow table 808 specifies network elements associated with each active packet flow, i.e., low-level information such as source and destination devices and ports associated with the packet flow. In addition, flow table 808 identifies pairs or groups of packet flows that collectively form a single communication session between a client and server. For example, flow table 808 may designate communication session as pairs of packet flows in opposite directions for flows sharing at least some common network addresses, ports and protocol.

The flow management module 806 in a further example provides stateful inspection of packet flows to identify attacks within packet flows. When flow management module 806 detects an attack, it executes a programmed response, such as sending an alert to security management module 814 for logging or further analysis, dropping packets of the packet flow, or ending the network session corresponding to the packet flow. The flow management module 806 may also block future connection requests originating from a network device having an identifier associated with a determined attack. In a further example, flow management module provides application-level inspection of packets, such as to allow HTTP traffic from web browsing while blocking HTTP traffic from file sharing applications.

Dynamic services module 880 leverages a honeypot service, such as an external honeypot service, to dynamically offer services specified by service requests. In other words, dynamic services module 880 processes service requests received via one of network interfaces 802, 804 so as to coordinate with the honeypot service to provide simulacra of respective services specified by the service requests. In this way, dynamic services module 880 is able to dynamically "stands up" a requested service on-the-fly to make it appear to a client device that issued the service request as if the requested service exists, regardless of whether the server from which the service is requested even exists or provides the service. The honeypot service may be provided by, e.g., honeypot 708 of FIG. 7.

Dynamic services module 880 includes service request table 830, Internet Control Message Protocol (ICMP) table 832, and attacker table 834. Service request table 830 represents a table or other data structure configured to store representations of service requests received by dynamic services module 880. For example, service request table 830 may store respective records for service requests, or "service request records," that each includes an address, a protocol (e.g., UDP or TCP), and a port. The address and port may be a destination address and a destination port, respectively, for the corresponding service requests. Each of the service request records may be associated with a timer that is set to a configurable time when the corresponding service request is received. The configurable time may be similar to the TCP SYN timeout time. If a timer for a service request record expires without dynamic services module 880 having received a service response for the corresponding service request, dynamic services module 880 may determine this to be a negative indication that the service requested by the service request does not exist. Dynamic services module 880 may also receive, for some service requests, service responses that include explicit negative indications for the corresponding service request. Upon obtaining a negative indication for a service request, dynamic services module 880 sends a representation of the service request to the honeypot service to dynamically offer the requested service in cooperation with the honeypot service.

In some cases, service request records of service request table 830 may indicate that a corresponding service request is an illegitimate, malicious, or otherwise a service request specifying a non-existent service. Upon obtaining a negative indication for a service request, dynamic services module 880 may mark the corresponding service request record in service request table 830 to indicate the service request specifies a non-existent service. Dynamic services module 880 may attempt to match subsequent service requests to a service request record of service request table 830. Upon matching a subsequent service request to a service request record that indicates the corresponding service request specifies a non-existent service, dynamic services module 880 may send a representation of the subsequent service request to the honeypot service without allowing the subsequent service request into the network and/or without waiting to obtain a negative indication of a service for the subsequent service request. Dynamic services module 880 may match subsequent service requests to service request records based on matching the specified services, as defined by a destination address, destination port, and/or protocol, for instance. Records of service requests stored in service request table 834, such as service requests that indicate the corresponding service request specifies a non-existent service, may expire over time.

ICMP table 832 represents a table or other data structure configured to store representations of probe messages ("probes") received by dynamic services module 880 but destined for other network devices of a network (which may or may not exist in the network). Client devices may attempt to probe a network by way of probes (e.g., ICMP echo requests, also known as "pings") to determine whether a server having a particular address exists in the network. Upon receiving a probe, dynamic services module 880 may record a representation of the probe to ICMP table 832. For example, ICMP table 832 may store respective records for probes that each includes a destination address of the probe and, in some cases, a source address of the probe (i.e., the client device that issued the probe). In some cases, dynamic services module 880 may respond to at least some of the received probes with a positive indication (e.g., an ICMP echo response) that indicates to the issuing client device that a server associated with the address of the probe exists in the network (even though such a server may not in fact exist but is merely being simulated by the dynamic services module 880). In this way, dynamic services module 880 may indicate to a client device that an address is associated with a server in the network, which may cause the client device to issue one or more service requests to the address in an attempt to obtain services, attack the network, and so forth.

In some cases, dynamic services module 880 may store a list of servers of the network, which an administrator may configure or dynamic services module 880 may obtain on the basis of probe responses from servers in the network. Upon receiving a probe from a client device, the dynamic services module 880 may first determine whether the server exists and, if the server does not exist, send a positive indication for the probe to the client device. On the other hand, if the server exists, the dynamic services module 880 may forward the probe to the server.

In some cases, dynamic services module 880 upon receiving a service request may forward the service request to the honeypot service only if the a record or a prior probe from the client device that issued the service request is present in the ICMP table 832.

Attacker table 834 stores records identifying known attackers, i.e., client devices that dynamic services module 880 has identified as attempting to intrude upon the network for malicious purposes. Dynamic services module 880 may obtain records of attackers by receiving such records from the honeypot service, by adding records upon forwarding a service request to the honeypot service because the service does not exist, by obtaining an indication that the client device is infected or malicious (such indications may include triggered intrusion prevention/detection system (IPS/IDS) rules or a confirmed malware infection), or by other methods. Attacker table 834 may identify attacker client devices using addresses of the attacker client devices. Upon receiving a service request from a known attacker, that is, an attacker identified in attacker table 834, dynamic services module 880 may automatically forward the service request to the honeypot service without waiting for a negative indication based on actions or non-actions of a server specified in the service request. Dynamic services module 880 assumes that service requests from attacker client devices is not for legitimate purposes and shunts such service requests to the honeypot service for processing. Records stored in attacker table 834 may expire over time.

In some example of network device 800, the network device 800 is configurable via user interface 818 such that an administrator may specify one or more non-existent services for which the network device 800 is to leverage the honeypot service. For instance, rules in rule database 816 may list a subset of the non-existent services of a network for which network device 800 is to send corresponding service requests to the honeypot service. Such services may be defined by a combination of address, port, and protocol, for instance. Upon obtaining a negative indication for a service request, dynamic services module 880 may first determine whether rule database 816 lists the service specified by the service request. If the service is listed in rule database 816, dynamic services module 880 may offer the service in cooperation with the honeypot service. If the service is not listed in rule database 816, dynamic services module 880 may forward the negative indication to the client device or simply drop the service request altogether (that is, prevent the network from responding to the client device). In this way, an administrator may configure network device 800 to limit the applicability of the honeypot service to a subset of potentially vulnerable service ports for which the network servers do not provide a service.

Techniques described above with respect to network device 800 may be used in conjunction with those describe above with respect to security appliance 200 of FIG. 2. For example, a single device or component of a device may both configure a virtual honeypot within a protected network and dynamically offer non-existent services in cooperation with a honeypot service. A remote honeypot may provide a honeypot service for the virtual honeypot as well as to offer non-existent services in the guise of servers of a protected network (again, whether or not such servers exist in the protected network).

Figure 9:
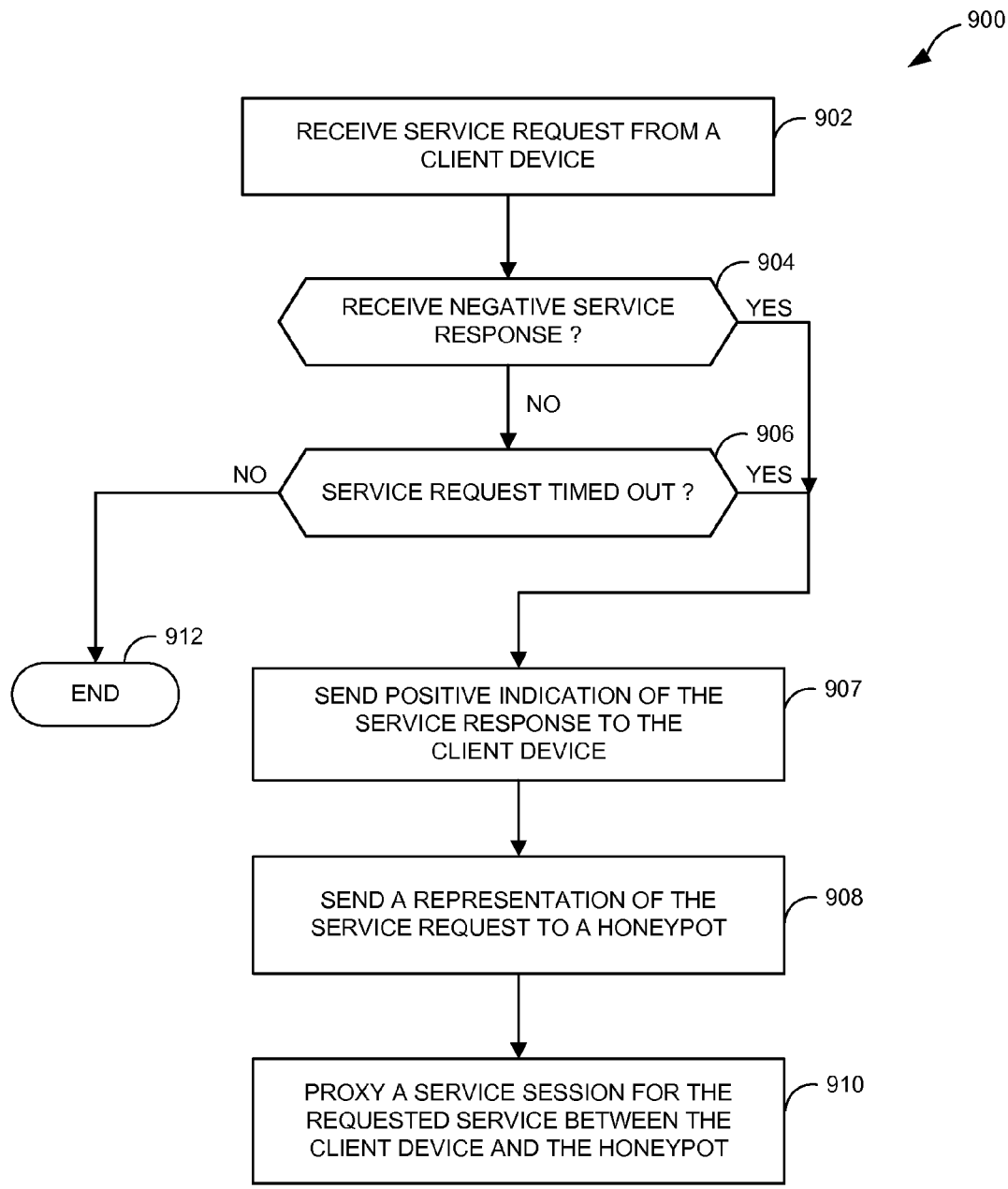
FIG. 9 is a flowchart illustrating an example mode of operation for a network device to offer a service in cooperation with a honeypot, in accordance with techniques described herein.

FIG. 9 is a flowchart illustrating an example mode of operation for a network device to offer a service in cooperation with a honeypot, in accordance with techniques described herein. Operation 900 is described with respect to network device 702 of FIG. 7.

Network device 702 receives a service request 720 from a client device 706 (902). In this example operation, network device 702 then waits to obtain an indication regarding the service specified by the service request 720 from a server 114 also specified by service request 720. If network device 702 receives an explicit negative indication for the service from server 114 (YES branch of 904) or the wait time for service request 720 expires (YES branch of 906), network device 702 issues a positive indication for the service to the client device 706 in the form of a service response 732 (907). If network device 702 receives a positive indication from server 114 (NO branches of 904 and 906), then network device 702 may forward the positive indication to client device 706 and, at least in some cases, take no further ameliorative action with respect to service request 720.

In addition or alternatively to issuing service response 732, network device 702 sends service request 724, a representation of service request 720, to a honeypot 708 (908). The honeypot 708 provides a honeypot service to network device 702 and may interact with client device 706 according to the service specified in service request 720. To facilitate this interaction, network device 702 may proxy a service session for the service specified by service request 720 between client device 706 and honeypot 708 (910).

Figure 10:
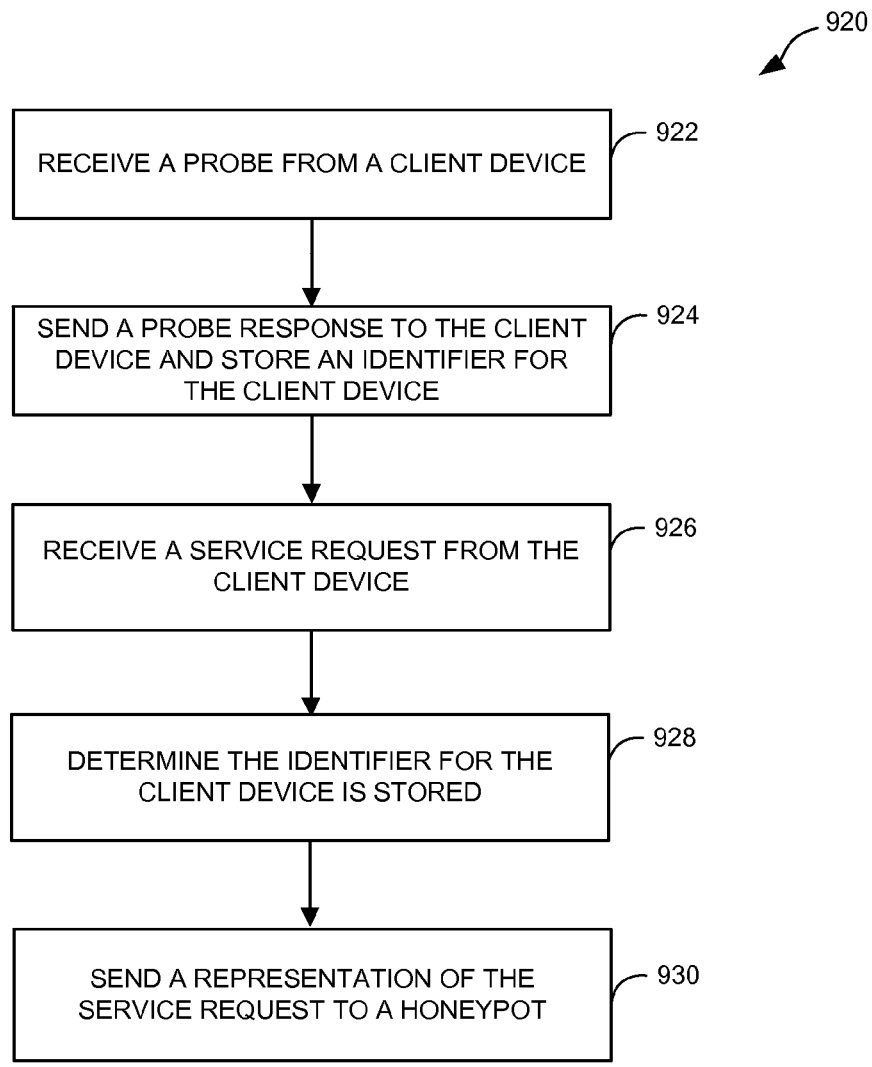
FIG. 10 is a flowchart illustrating an example mode of operation for a network device to offer a service in cooperation with a honeypot, in accordance with techniques described herein.

FIG. 10 is a flowchart illustrating an example mode of operation for a network device to offer a service in cooperation with a honeypot, in accordance with techniques described herein. Operation 920 is described with respect to network device 702 of FIG. 7.

Network device 702 receives a probe, such as an ICMP echo request or "ping," from client device 706 (922). The probe may specify, as a destination address, the address for any of servers 110, 112, or 114, or may specify an address that is not associated with any device in the protected network 122. In response to receiving the probe, the network device 702 may send a probe response to client device 706 indicating the destination device specified by the probe exists, that is, is associated with a server in protected network 122 (even if the destination device does not, in fact, exist within protected network 122) (924). In addition, network device 702 stores an identifier for client device 706 to record that network device 702 received a probe from client device 706 (926).

Subsequently, network device 702 receives a service request from client device 706 (926). Only upon determining network device 702 previously received the probe from client device 706 based on the stored identifier for client device 706 (928), network device 702 sends a representation of the service request to a honeypot to dynamically stand up the service specified by the service request (930). If the identifier for client device 706 is not stored, the network device 702 may alternatively drop the service request.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:
   receiving, by a network device from a client device, a service request to receive a service indicated in the service request from a server indicated in the service request, wherein the service request specifies an address for the server indicated in the service request, and wherein the address is not associated with the network device; and
   by the network device and in response to obtaining a negative indication for the service that indicates the server indicated in the service request does not offer the service, sending a representation of the service request to a honeypot to cause the honeypot to offer the service to the client device, wherein the negative indication for the service comprises an expiry of a timer for the service response without the network device having received a positive indication for the service from the server indicated in the service request.

2. The method of claim 1,
   wherein the service request includes address for the server indicated in the service request comprises a layer 3 destination address to indicate the server indicated in the service request, and
   wherein no server of a network that includes the network device has a layer 3 address that is the layer 3 destination address.

3. The method of claim 1, further comprising:
   generating, by the network device in response to obtaining a negative indication for the service that indicates the server indicated in the service request does not offer the service, a positive indication for the service; and
   sending, by the network device to the client device, the positive indication for the service.

4. The method of claim 1, further comprising:
proxying, by the network device, a service session for the service between the honeypot and the client device to offer the service to the client device.

5. The method of claim 1,
wherein the service request comprises a first service request, and
wherein the negative indication for the service comprises a negative indication for the first service request, the method further comprising:
receiving, by the network device, a second service request specifying the service; and
by the network device and in response to obtaining the negative indication for the first service request, sending a representation of the second service request to the honeypot to cause the honeypot to offer the service to the client device without obtaining a negative indication for the second service request.

6. The method of claim 1,
wherein the network device comprises a security appliance, and
wherein the service request includes a layer 3 destination address for the server indicated in the service request, wherein the server is located within a network protected by the security appliance.

7. The method of claim 1,
wherein the network device comprises a security appliance, and
wherein the client device is located within a network protected by the security appliance.

8. The method of claim 1, wherein the representation of the service request causes the honeypot to dynamically offer the service to imitate the service to the client device as if the service were provided by the server indicated in the service request.

9. A method comprising:
receiving, by a network device, a probe from a client device;
receiving, by the network device from the client device and after receiving the probe, a service request to receive a service indicated in the service request from a server indicated in the service request;
sending, by the network device in response to obtaining a negative indication for the service that indicates the server indicated in the service request does not offer the service and determining the network device previously received the probe from the client device, a representation of the service request to a honeypot to cause the honeypot to offer the service to the client device.

10. The method of claim 9, wherein the probe specifies a destination address that is not associated with the network device, the method further comprising:
by the network device and in response to receiving the probe from the client device, generating a probe response indicating that the destination address is associated with the server indicated in the service request; and
sending, by the network device, the probe response to the client device.

11. The method of claim 9,
wherein the probe comprises an Internet Control Message Protocol echo request, and
wherein the probe response comprises an Internet Control Message Protocol echo response.

12. The method of claim 9,
wherein the probe specifies a destination address that is not associated with the network device, and
wherein the destination address is not associated with any server of a network that includes the network device.

13. The method of claim 9,
wherein the service request specifies an address for the server indicated in the service request, wherein the address is not associated with the network device, and
wherein obtaining a negative indication for the service comprises receiving, by the network device, a negative service response for the service from the server indicated in the service request.

14. The method of claim 13,
wherein the service request comprises a Transmission Control Protocol SYN packet, and
wherein the negative service response comprises a Transmission Control Protocol SYN RST packet.

15. The method of claim 9, wherein the negative indication for the service comprises an expiry of a timer for the service response without the network device having received a positive indication for the service from the server indicated in the service request.

16. A non-transitory computer-readable storage medium comprising instructions stored thereon that, when executed, configure one or more processors to:
receive, by a network device from a client device, a service request to receive a service indicated in the service request from a server indicated in the service request, wherein the service request specifies an address for the server indicated in the service request, and wherein the address is not associated with the network device; and
by the network device and in response to obtaining a negative indication for the service that indicates the server indicated in the service request does not offer the service, send a representation of the service request to a honeypot to cause the honeypot to offer the service to the client device, wherein the negative indication for the service comprises an expiry of a timer for the service response without the network device having received a positive indication for the service from the server indicated in the service request.

17. A network device comprising:
one or more processors coupled to a memory;
a dynamic services module configured for execution by the one or more processors to:
receive, from a client device, a service request to receive a service indicated in the service request from a server indicated in the service request, wherein the service request specifies an address for the server indicated in the service request, and wherein the address is not associated with the network device; and
in response to obtaining a negative indication for the service that indicates the server indicated in the service request does not offer the service, send a representation of the service request to a honeypot to cause the honeypot to offer the service to the client device, wherein the negative indication for the service comprises an expiry of a timer for the service response without the network device having received a positive indication for the service from the server indicated in the service request.

18. The network device of claim 17,
wherein the address for the server indicated in the service request comprises a layer 3 destination address, and wherein no server of a network that includes the network device has a layer 3 address that is the layer 3 destination address.

19. The network device of claim 17,
wherein the dynamic services module is further configured for execution by the one or more processors to generate, in response to obtaining a negative indication for the service that indicates the server indicated in the service request does not offer the service, a positive indication for the service, and
wherein the dynamic services module is further configured for execution by the one or more processors to send, to the client device, the positive indication for the service.

20. The network device of claim 17, wherein the dynamic services module is further configured for execution by the one or more processors to proxy a service session for the service between the honeypot and the client device to offer the service to the client device.

21. The network device of claim 17,
wherein the service request comprises a first service request, and
wherein the negative indication for the service comprises a negative indication for the first service request,
wherein the dynamic services module is further configured for execution by the one or more processors to receive a second service request specifying the service, and
wherein the dynamic services module is further configured for execution by the one or more processors to, in response to obtaining the negative indication for the first service request, send a representation of the second service request to the honeypot to cause the honeypot to offer the service to the client device without obtaining a negative indication for the second service request.

22. The network device of claim 17,
wherein the network device comprises a security appliance, and
wherein the service request includes a layer 3 destination address for the server indicated in the service request,
wherein the server is located within a network protected by the security appliance.

23. The network device of claim 17,
wherein the network device comprises a security appliance, and
wherein the client device is located within a network protected by the security appliance.

24. The network device of claim 17, wherein the representation of the service request causes the honeypot to dynamically offer the service to imitate the service to the client device as if the service were provided by the server indicated in the service request.

25. A network device comprising:
one or more processors coupled to a memory;
a dynamic services module is further configured for execution by the one or more processors to:
receive, a probe from a client device;
receive, from the client device after receiving the probe, a service request to receive a service indicated in the service request from a server indicated in the service request; and
in response to obtaining a negative indication for the service that indicates the server indicated in the service request does not offer the service and determining the network device previously received the probe from the client device, send a representation of the service request to a honeypot to cause the honeypot to offer the service to the client device.

26. The network device of claim 25,
wherein the probe includes a layer 3 destination address that is not associated with the network device,
wherein the dynamic services module is further configured for execution by the one or more processors to, in response to receiving the probe from the client device, generate a probe response indicating that the layer 3 destination address is associated with the server indicated in the service request, and
wherein the dynamic services module is further configured for execution by the one or more processors to send the probe response to the client device.

27. The network device of claim 25,
wherein the probe comprises an Internet Control Message Protocol echo request, and
wherein the probe response comprises an Internet Control Message Protocol echo response.

28. The network device of claim 25,
wherein the probe includes a layer 3 destination address to indicate the server indicated in the service request, and
wherein no server of a network that includes the network device has a layer 3 address that is the layer 3 destination address.

29. The network device of claim 25,
wherein the service request specifies an address for the server indicated in the service request, and
wherein to obtain a negative indication for the service the dynamic service module is further configured for execution by the one or more processors to receive a negative service response for the service from the server indicated in the service request.

30. The network device of claim 29,
wherein the service request comprises a Transmission Control Protocol SYN packet, and
wherein the negative service response comprises a Transmission Control Protocol SYN RST packet.

31. The network device of claim 25, wherein the negative indication for the service comprises an expiry of a timer for the service response without the network device having received a positive indication for the service from the server indicated in the service request.

* * * * *